United States Patent
Hofmeister

(10) Patent No.: US 9,452,527 B2
(45) Date of Patent: Sep. 27, 2016

(54) ROBOT HAVING HIGH STIFFNESS COUPLING

(71) Applicant: Persimmon Technologies, Corp., Wakefield, MA (US)

(72) Inventor: Christopher Hofmeister, Hampstead, NH (US)

(73) Assignee: Persimmon Technologies, Corp., Wakefield, MA (US)

( * ) Notice: Subject to any disclaimer, the term of this patent is extended or adjusted under 35 U.S.C. 154(b) by 620 days.

(21) Appl. No.: 13/790,156

(22) Filed: Mar. 8, 2013

(65) Prior Publication Data

US 2014/0137690 A1    May 22, 2014

Related U.S. Application Data

(60) Provisional application No. 61/727,822, filed on Nov. 19, 2012.

(51) Int. Cl.
*B25J 9/04* (2006.01)
*B25J 9/10* (2006.01)

(52) U.S. Cl.
CPC .............. *B25J 9/1065* (2013.01); *B25J 9/042* (2013.01); *Y10T 29/49826* (2015.01); *Y10T 74/20335* (2015.01)

(58) Field of Classification Search
CPC ............................. B25J 9/042; B25J 9/1065
See application file for complete search history.

(56) References Cited

U.S. PATENT DOCUMENTS

| | | | | |
|---|---|---|---|---|
| 4,341,502 | A * | 7/1982 | Makino | B25J 9/107 414/744.1 |
| 5,222,409 | A * | 6/1993 | Dalakian | B25J 9/1065 414/733 |
| 5,765,983 | A | 6/1998 | Caveney et al. | 414/217 |
| 5,885,052 | A * | 3/1999 | Tsuji | B25J 9/1065 414/744.6 |
| 6,293,746 | B1 * | 9/2001 | Ogawa | B25J 9/042 414/744.4 |
| 6,315,512 | B1 | 11/2001 | Tabrizi et al. | 414/217 |
| 6,363,808 | B1 | 4/2002 | Wakabayashi et al. | 74/490.03 |
| 6,593,718 | B1 * | 7/2003 | Yamazoe | B25J 9/042 318/568.11 |
| 2011/0120253 | A1 * | 5/2011 | Tara | B25J 9/042 74/490.02 |

* cited by examiner

*Primary Examiner* — Gerald McClain
(74) *Attorney, Agent, or Firm* — Harrington & Smith

(57) ABSTRACT

A substrate transport arm including a plurality of links rotatably connected to each other in series; and a system for maintaining radial orientation of a third one of the links regardless of a rotational angle of first and second ones of the links relative to each other. The system for maintaining radial orientation includes a four-bar linkage.

15 Claims, 5 Drawing Sheets

ROBOT HAVING HIGH STIFFNESS COUPLING

CROSS REFERENCE TO RELATED APPLICATION

This application claims priority under 35 USC 119(e) on U.S. Provisional Patent Application No. 61/727,822 filed Nov. 19, 2012, which is hereby incorporated by reference in its entirety.

BACKGROUND

1. Technical Field

The exemplary and non-limiting embodiments relate generally to a substrate transport arm and, more particularly, to maintaining radial orientation of a member of the arm.

2. Brief Description of Prior Developments

U.S. Pat. No. 6,363,808 discloses a conveying arm assembly.

SUMMARY

The following summary is merely intended to be exemplary. The summary is not extended to limit the scope of the claims.

In accordance with one aspect of an example embodiment, a substrate transport arm includes a plurality of links rotatably connected to each other in series; and a system for maintaining radial orientation of a third one of the links regardless of a rotational angle of first and second ones of the links relative to each other. The system for maintaining radial orientation includes a four-bar linkage.

In accordance with one aspect of an example embodiment, a substrate transport arm comprises a first link; a second link rotatably connected to the first link at a first end of the second link; a wrist at a second end of the second link; and a connection between a shaft at the first end of the second link and the wrist. The connection comprises two bars having first ends rotatably connected to a first carrier at the first end of the second link, and second ends rotatably connected to the wrist at the second end of the second link.

In accordance with one aspect of an example method, a method of assembly comprises rotatably connecting a first link of a substrate transport arm to a second link; and connecting a shaft at a first end of the second link to a wrist at a second end of the second link by a connection forming a four-bar linkage between the shaft and the wrist.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
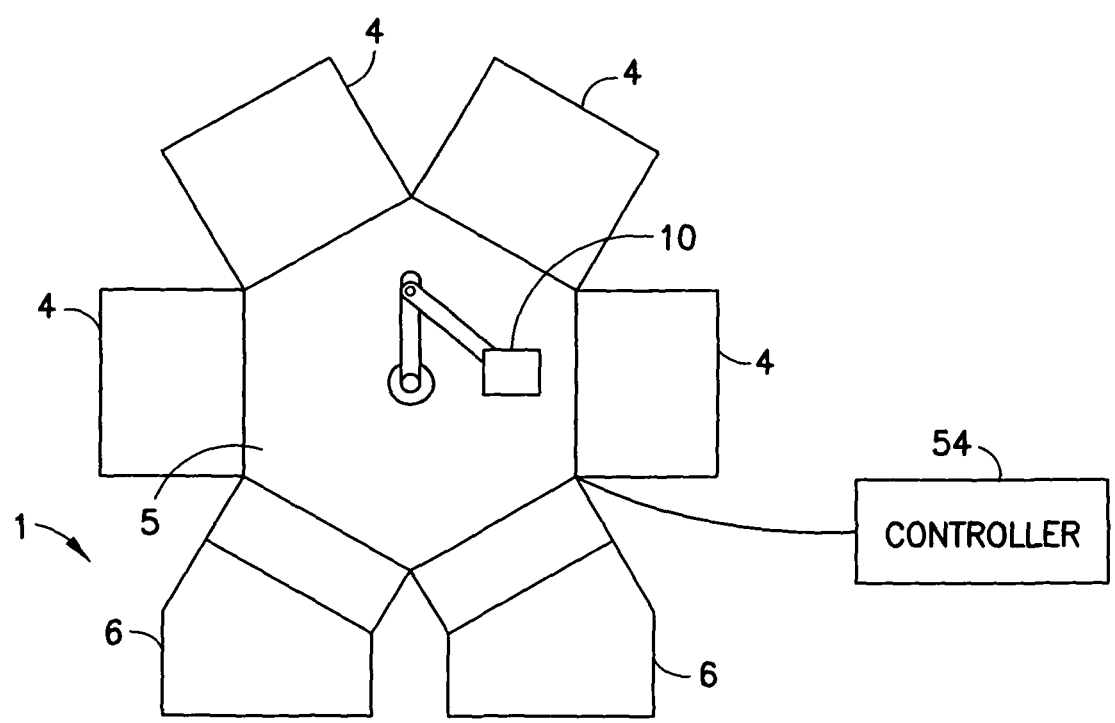
FIG. 1 is a diagram illustrating an example apparatus.

Referring to FIG. 1, there is shown a schematic top plan view of an example substrate processing apparatus 1 having a substrate transport apparatus or robot system 10. Although the present invention will be described with reference to the embodiments shown in the drawings, it should be understood that the present invention may be embodied in many forms of alternative embodiments. In addition, any suitable size, shape or type of materials or elements could be used.

In addition to the substrate transport apparatus 10, in this example embodiment the substrate processing apparatus 1 includes multiple substrate processing chambers 4 and substrate cassette elevators 6 connected to a vacuum chamber 5. The transport apparatus 10 is located, at least partially, in the chamber 5 and is adapted to transport planar substrates, such as semiconductor wafers or flat panel displays, between and/or among the chambers 4 and elevators 6. In alternate embodiments, the transport apparatus 10 could be used in any suitable type of substrate processing apparatus. A controller 54 may be connected to the transport apparatus 10 and chambers 4,6 to control the various devices.

A conventional vacuum environment robotic manipulator typically includes a drive unit which houses all active components of the robotic manipulator, e.g., actuators and sensors, and one or more arms driven by the drive unit. The arm(s) are typically passive mechanisms, i.e., they do not include any active components, such as actuators and sensors. This is primarily due to difficulties with out-gassing, power distribution and heat removal in vacuum environments.

In a conventional vacuum environment robotic manipulator, since the arm(s) of the robotic manipulators are passive mechanisms, the number of independently driven links is limited to the number of motion axes provided by the drive unit and further constrained by the complexity of transmission of the actuation torques to the individual links of the arm(s). This may limit the arm configurations used in practice, which in turn may limit the reach and throughput performance of the existing vacuum environment robotic manipulators.

Figure 2:
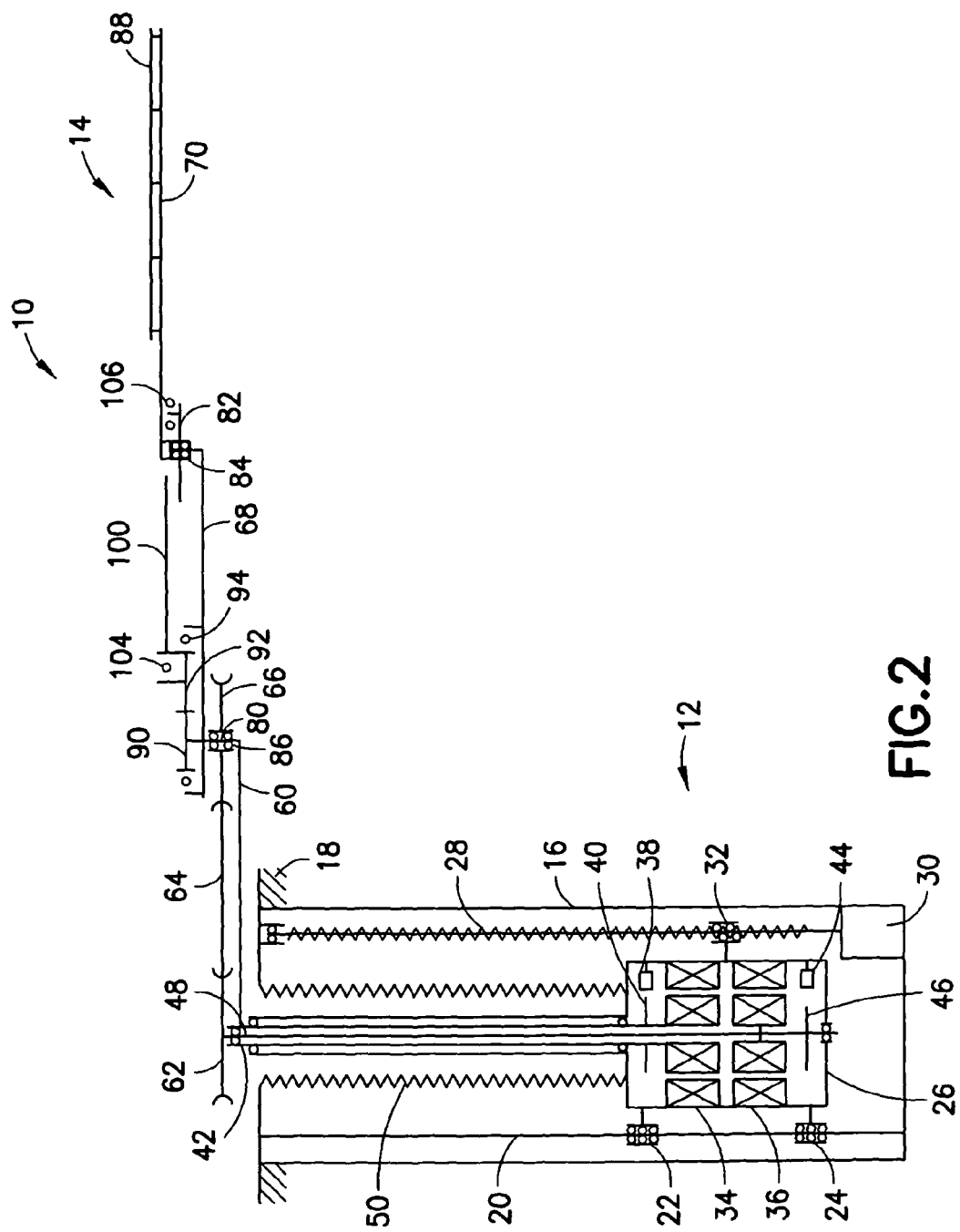
FIG. 2 is a schematic sectional diagram illustrating a robot system of the example apparatus shown in FIG. 1.

Referring also to FIG. 2, in this example embodiment the robot system 10 includes a drive unit 12 and a substrate transport arm 14. The drive unit 12 may enable a plurality of rotary motion axes and vertical lift motion axes and one or more arm assemblies, e.g., arm assembly 14 driven by the drive unit 12. Drive unit chassis 16 may be suspended from mounting arrangement 18. The arrangement 18 may be a chamber, such as the vacuum chamber 5. Alternatively, the mounting arrangement may be on the side, at the bottom, or the drive unit may be mounted in any other suitable manner. Drive unit 12 may include one or more vertical rails 20 with linear bearings 22, 24 to provide guidance to movable housing 26 vertically driven by screw 28 rotated by motor 30. Ball assembly 32 is fixed to housing 26 and is driven by screw 28. In this example, only one guide rail 20 is shown for simplicity. Motor 30, screw 28, and ball 132 may form the Z-axis drive for housing 26.

Housing 26, itself, may incorporate two rotary motion axes. The first rotary motion axis of housing 26 may comprise a motor, 34 (e.g., a stator/rotor pair), and a position encoder, including, for example, encoder read-head 38 and encoder disk 40 for shaft 42. The second rotary motion axis incorporated into the housing may include another motor 36 and a position encoder, comprising, for example, encoder read-head 44 and encoder disk 46 for shaft 48.

Housing 26 of the drive unit 12 may have an internal motor configuration (rotors internal to stators) and a radial position encoder configuration (encoder read-heads arranged radially with respect to encoder disks). Although motors and one arm are shown, more may be provided. In alternate aspects, the various motor and encoder arrangements used in housing 26 may employ external motor configurations (see for example U.S. Pat. No. 6,363,808 which is hereby incorporated by reference in its entirety). In addition, as a feature of one or more embodiments of the robot system with independent arms, the motors in each housing, whether configured in an internal or external arrangement, may be located coaxially or in a parallel configuration in the same plane (as opposed to being stacked). The stators may be located in vacuum, and a separation wall between the stators and rotors may be used, magnetic couplers or feed through(s) may be employed or another sealing arrangement may be used.

In the example shown, two rotary motion axes, one vertical lift axes, and one arm is shown. However, in other examples, any number of rotary motion axes, vertical lift axes, and arms may be used.

In one aspect, bellows 50 may be used to accommodate motion of housing 26 along rail(s) 20 separating the environment where motor rotors and encoder disks operate, for example, in a vacuum from the outside environment, e.g., the atmosphere. Although the dive unit 12 has been described in detail above, it should be understood that features as described herein may be used with any suitable drive.

Motor 34 may drive hollow shaft 42 which may be connected to first link 60 of arm assembly 14. Similarly, motor 36 may be connected to coaxial inner shaft 48 which may be coupled (via a belt drive comprising, for example, pulley 62, belt 64 and pulley 66) to second link 68. Alternately, motor 36 and encoder 44, 46 may be packaged in the first link 60 directly or indirectly driving the second link 68.

As will be described with respect to FIGS. 3A-C and 4A-4C, an arrangement may be employed to maintain radial orientation of end-effector 70 regardless of the position of first and second links 60, 68. Here, this may be achieved due to a 1:2 ratio between a shaft 80 incorporated into the first link 60, and the wrist 82 connected to the end-effector 70 where the wrist 82 is rotatable on second link 68 by a bearing 84 coupling the wrist 82 to the second link 68. The first link 60 and the second link 63 may be coupled via bearings or rotary joint 86. The second link 68 and the end-effector 70 may be coupled through rotary joint 84. The end-effector 70 may carry payload 88, for example, a semiconductor substrate or other suitable substrate or payload. In alternate embodiments, any suitable ratio may be provided, such as fixed, variable or otherwise.

Figure 3A:
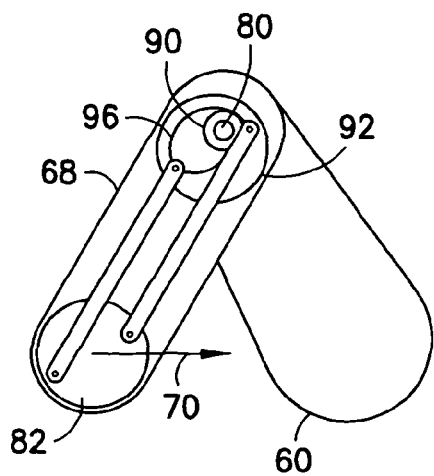
FIGS. 3A-3C are diagrams illustrating portions of one arm shown in FIGS. 1-2 at three different positions.
Figure 3B:
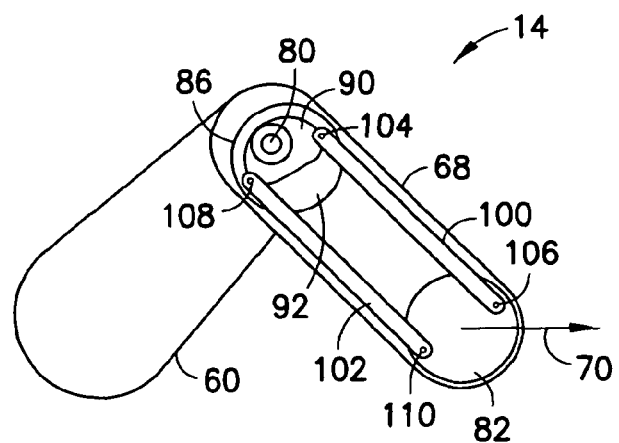
Figure 3C:
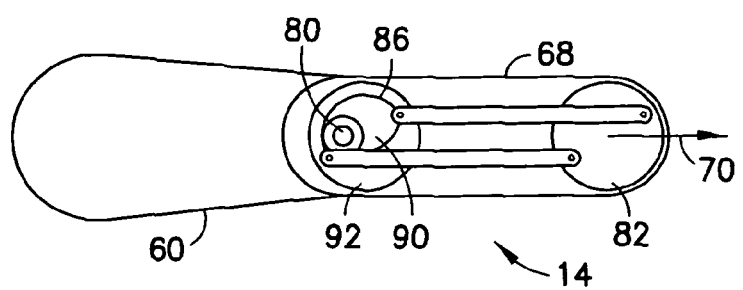

Referring also to FIGS. 3A, 3B and 3C, the arm 14 is shown in three positions: a retracted position, an extending position, and an extended position, respectively. The arm 14 is shown without its end effector 70 merely for the sake of clarity. The end effector is fixedly connected to the wrist 82 to move with the wrist, and rotate with the wrist. The shaft 80 has gear 90 fixed thereto such that rotation of the first link 60 relative to the second link 68 effects rotation of the gear 90 with relative to the second link 68. A ring or first carrier 92 is coupled to the second link 68 with bearing(s) 94. The first carrier 92 is rotatable on the second link 68.

The ring 92 has an internal ring gear portion 96. The internal ring gear portion 96 meshes with the gear 90. In the example shown, the internal ring gear portion 96 has twice as many teeth as the gear 90 such that a 2:1 ratio is formed between the ring gear portion 96 and one gear 90. The internal ring gear portion 96 and the gear 90 may also be preloaded by any suitable means such that there is no backlash between them. In alternate aspects, any suitable 2:1 ratio between the carrier 92 and the shaft 80 may be provided, such as shown in the alternate example embodiment of FIGS. 5A-5C or otherwise, with any suitable 2:1 coupling.

Both the carrier 92 and the wrist 82 are supported on the second link 68. However, in addition, the carrier 92 is coupled to the wrist 82' by two links or bars 100, 102. These four members (the carrier 92, the wrist 82, and the two links or bars 100, 102) help to form a system for maintaining radial orientation of the end effector 70 regardless of a rotational angle of first and second links 60, 68 relative to each other. This system for maintaining radial orientation of the end effector 70 is located, at least partially, on the second link 68. However, the second link 68 supports the end effector 70. The radial orientation maintenance system merely controls the angular orientation on the end effector 70 on the second link 68.

The bars 100, 102 each have connections 104, 106, 108, 110 to the first carrier and the wrist which allow the bars to rotate or pivot. This effectively forms a four bar parallelogram type linkage among the carrier 92, the wrist 82, and the bars 100, 102. In an example embodiment, the four connections 104, 106, 108, 110 comprise preloaded bearing connections. By use of preloaded bearing connections the stiffness of the four bar linkage can be selected by the manufacturer, and perhaps even adjusted after installation. In one type of example embodiment the preloads may be kept to a minimum to eliminate backlash/clearance dead zone, while minimizing friction and hysteresis. In alternate aspects, a single link or multiple links may be provided or any suitable coupling between the carrier 92 and the wrist 82, such as a band or belt arrangement, a rack and pinion coupling (the carrier 92, the wrist 82 forming the pinions and links 100, 102 replaced with one or more racks) or any alternate coupling. In alternate aspects, the gear 90 may form a first pinion and the wrist 82 may form a second pinion with a rack directly coupling them in a 2:1 ratio obviating the need for carrier 92 and bars 100, 102.

As shown, bars 100, 102 form a rotational 1:1 coupling between the carrier 92 and the wrist 82 such that an effective ratio between the shaft 80 and the wrist 82 is 2:1. In alternate aspects, a combination of different ratios between the shaft 80 and the carrier 92, and between the carrier 92 and the wrist 82, may be provided such that an effective ratio between the shaft 80 and the wrist 82 is 2:1.

Figure 4A:
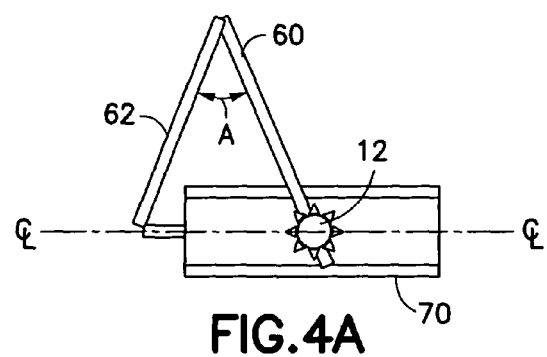
FIGS. 4A-4C are diagrams illustrating maintaining of orientation of the end effector in the three different positions shown in FIGS. 3A-3C.
Figure 4B:
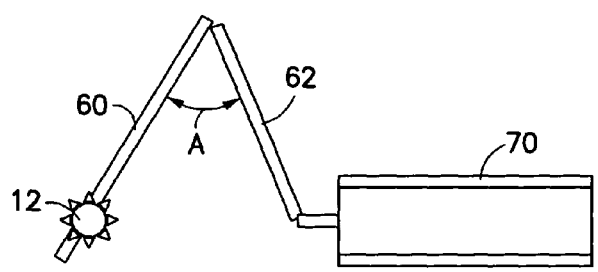
Figure 4C:
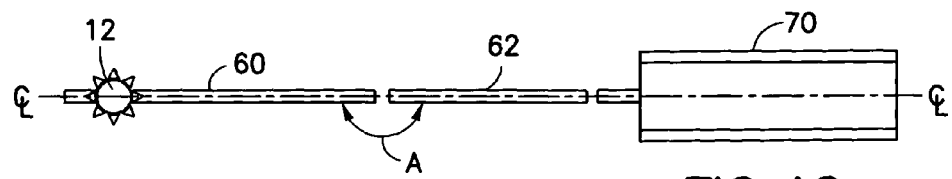

In the example embodiment shown, the wrist 82 is, thus, maintained in radial alignment with respect to the rotational axis of drive 12; irrespective of the location of the links 60 and 68. The angular orientation of the pivots 104, 108, 106, 100 relative to the axis of rotation of the carrier 92 and the wrist 82 are such that at extremes of motion (FIG. 3A and FIG. 3C as one example; other extremes may be provided) the locations are essentially mirrored and symmetric and the location in the middle of the extremes makes the parallelogram formed essentially a rectangle. Alternately, the angular orientation may be skewed to provide a stiffer coupling between the carrier 92 and the wrist 82 at a desired or selectable location. As seen with reference to FIGS. 4A-4C, features as described above allow an angular position of the end effector 70 to not change. Regardless of the angle A between the first and second links 60, 68, the angular orientation of the wrist 82 is maintained to always maintain the orientation of the end effector 70 in a same orientation as the end effector is moved between the retraced position (FIGS. 3A and 4A) and the extended position (FIGS. 3C and 4C). In the example embodiment described, this alignment is accomplished by the 4-bar alignment linkage described herein.

A four-bar linkage, also called a four-bar, is the simplest movable closed chain linkage. It consists of four bodies, called bars or links, connected in a loop by four joints. Generally, the joints are configured so the links move in parallel planes, and the assembly is called a planar four-bar linkage. Planar quadrilateral linkage, RRRR or 4R linkages have four rotating joints. The configuration of a quadrilateral linkage may be classified into three types: convex, concave, and crossing. In the convex and concave cases no two links cross over each other. In the crossing linkage two links cross over each other. In the convex case all four internal angles are less than 180 degrees, and in the concave configuration one internal angle is greater than 180 degrees. There exists a simple geometrical relationship between the lengths of the two diagonals of the quadrilateral. For convex and crossing linkages, the length of one diagonal increases if and only if the other decreases.

Figure 5A:
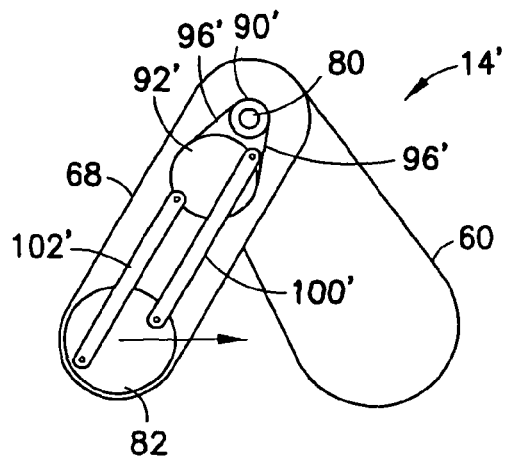
FIGS. 5A-5C are diagrams illustrating another example arm similar to FIGS. 3A-3C at three different positions.
Figure 5B:
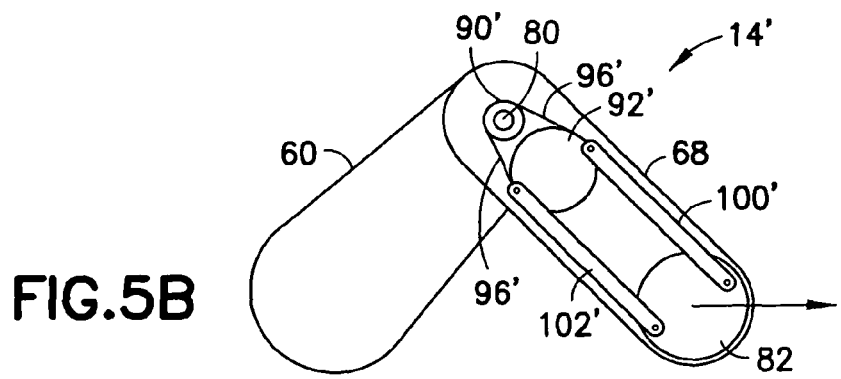
Figure 5C:
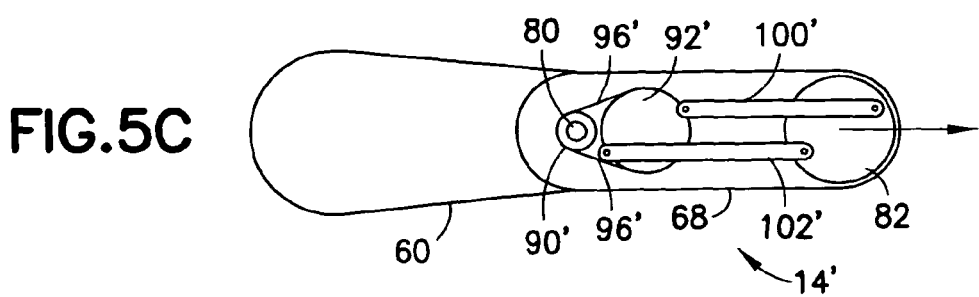

Referring now to FIGS. 5A, 5B and 5C, there is shown another example embodiment. In these figures the arm 14' is shown in its retracted position, extending position and extended position, respectively. The shaft 80 has a pulley 90' fixed there to such that rotation of the first link 60 relative to the second link 68 effects rotation of the pulley 90' relative to the second link 68. The pulley 92' is rotatable and coupled to the second link 68 with bearings. The pulley 92' has bands 96' that couple to the pulley 90' and having twice the diameter such that a 2:1 ratio is formed between the pulley 92' and the pulley 90'. The bands 96' may be preloaded by any suitable means such that there is no backlash. In alternate aspects, any suitable 2:1 ratio between carrier 92' and shaft 80 may be provided. The carrier 92' is similarly coupled to the wrist 82 by bars 100', 102' where the bars 100', 102' each have preloaded bearing connections effectively forming a four bar parallelogram type linkage among the carrier 92', the wrist 82, and the bars 100', 102'. In alternate aspects, a single bar or multiple bars may be provided or any suitable coupling may be provided. In the embodiment shown, the wrist 82 is, thus, maintained in radial alignment with respect to the rotational axis of drive 12 irrespective of the location of the first and second links 60 and 68.

Although specific features of the disclosed embodiment or embodiments are shown in some drawings and not in others, this is for convenience only as each feature may be combined with any or all of the other features in accordance with the Invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In one type of example embodiment, a substrate transport arm may comprise a plurality of links 60, 68, 70 rotatably connected to each other in series; and a system for maintaining radial orientation of a third one 70 of the links regardless of a rotational angle of first and second ones 60, 68 of the links relative to each other, where the system for maintaining radial orientation comprises a four-bar linkage 82, 90, 100, 102.

The four bar linkage may comprise a quadrilateral linkage have four rotating joints. The quadrilateral linkage may comprise a parallelogram linkage. The quadrilateral linkage may comprise a convex quadrilateral linkage. The third link may comprise an end effector, and where a member of the four-bar linkage is a wrist rotatably connecting the end effector to the second link. The four-bar linkage may comprise a rotatable carrier on a first end of a second one of the links, a rotatable wrist on an opposite second end of the second link, and two bars having first ends rotatably connected to the rotatable carrier and second ends rotatably connected to the wrist. The rotatable carrier may comprise a ring with teeth at an internal aperture. A shaft 80 may be connected to a first one of the links, where a gear 90 on the shaft has teeth engaging the teeth of the rotatable carrier. A shaft 80 may be connected to a first one of the links, where a pulley 90' on the shaft is connected to the rotatable carrier by a band. The system for maintaining radial orientation may comprise a drive ratio of 2:1 between a shaft on a first one of the links and a wrist connecting a second one of the links to a third one of the links.

In one type of example embodiment, a substrate transport arm may comprise a first link; a second link rotatably connected to the first link at a first end of the second link; a wrist at a second end of the second link; and a connection between a shaft at the first end of the second link and the wrist, where the connection comprises two bars having first ends rotatably connected to a first carrier at the first end of the second link, and second ends rotatably connected to the wrist at the second end of the second link.

The first carrier, the two bars and the wrist may form a quadrilateral linkage have four rotating joints. The quadrilateral linkage may comprise a parallelogram linkage. The substrate transport arm may further comprise an end effector connected to the wrist, where the apparatus comprises a system for maintaining a same radial orientation of the end effector regardless of a rotational angle of the first and second links relative to each other. The first carrier may comprise a ring with teeth at an internal aperture, where a shaft is connected to the first link, and where a gear on the shaft has teeth engaging the teeth of the carrier. A shaft may be connected to the first link, and where a pulley on the shaft is connected to the first carrier by a band. A drive ratio of 2:1 may be provided between a shaft on the first link and the wrist.

An example method of assembly may comprise rotatably connecting a first link of a substrate transport arm to a second link; and connecting a shaft at a first end of the second link to a wrist at a second end of the second link by a connection forming a four-bar linkage between the shaft and the wrist.

The four-bar linkage may comprise a rotatable carrier on a first end of the second link, the wrist rotatably located on an opposite second end of the second link, and two bars having first ends rotatably connected to the rotatable carrier and second ends rotatably connected to the wrist. Radial orientation of an end effector connected to the wrist may be maintained, regardless of a rotational angle of the first and second links relative to each other, by the connection with the four bar linkage.

Aside from the embodiment or embodiments disclosed above, the disclosed embodiment or embodiments are capable of other embodiments and of being practiced or being carried out in various ways. Thus, it is to be understood that the disclosed embodiments are not limited in its application to the details of construction and the arrangements of components set forth in the description or illustrated in the drawings.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A substrate transport arm comprising:
a plurality of links rotatably connected to each other in series;
a system for maintaining radial orientation of a third one of the links regardless of a rotational angle of first and second ones of the links relative to each other, where the system for maintaining radial orientation comprises a four-bar linkage connected to at least one of the plurality of links, where the four-bar linkage comprises a rotatable carrier pulley rotatably mounted to the second link, where a band connects the rotatable carrier pulley to a shaft at a joint of the second link to the first link, where a drive pulley is fixedly mounted on the shaft, and where the band extends between the rotatable carrier pulley and the drive pulley, where the drive pulley is located inside a loop formed by the band, and where the four-bar linkage is mounted on the second link.

2. A substrate transport arm as in claim 1 where the four bar linkage comprises a quadrilateral linkage have four rotating joints.

3. A substrate transport arm as in claim 2 where the quadrilateral linkage comprises a parallelogram linkage.

4. A substrate transport arm as in claim 2 where the quadrilateral linkage comprises a convex quadrilateral linkage.

5. A substrate transport arm as in claim 1 where the third link comprises an end effector, and where a member of the four-bar linkage is a wrist rotatably connecting the end effector to the second link.

6. A substrate transport arm as in claim 1 where the rotatable carrier pulley is on a first end of the second link, and where the four-bar linkage comprises a rotatable wrist on an opposite second end of the second link, and two bars having first ends rotatably connected to the rotatable carrier pulley and second ends rotatably connected to the wrist.

7. A substrate transport arm as in claim 1 where where the system for maintaining radial orientation comprises a drive ratio of 2:1 between the shaft on the first link and a wrist connecting the second link to the third link one of the links.

8. A substrate transport arm as in claim 1 where the four-bar linkage comprises a wrist member rotatably mounted on the second link, where the third link is fixedly connected to the wrist member, and where two other members of the four-bar linkage are rotatable connected to the wrist member.

9. A substrate transport arm as in claim 1 where the four-bar linkage is completely supported on the second link.

10. A substrate transport arm comprising:
a plurality of links rotatably connected to each other in series, where the plurality of links comprise a first link, a second link and a third link;
a four-bar linkage connected to at least one of the plurality of links, where the four-bar linkage comprises a carrier rotatably mounted to the second link, a wrist member rotatably mounted to the second link, and two bars connecting the carrier to the wrist member, where the two bars have first ends rotatably connected to the carrier and second ends rotatably connected to the wrist member, and where the wrist member at least partially connects the third link to the second link,
where the four-bar linkage and a connection of the four-bar linkage to the first link are configured to maintain radial orientation of the third link relative to the first and second links regardless of a rotational angle of the second link relative to the first link, where the carrier comprises a rotatable carrier pulley rotatably mounted to the second link, where a shaft is provided at a joint of the second link to the first link, where a drive pulley is fixedly mounted on the shaft, where a band connects the rotatable carrier pulley to a shaft at the joint of the second link to the first link at the drive pulley, where the band extends between the rotatable carrier pulley and the drive pulley, and where the drive pulley is located inside a loop formed by the band.

11. A substrate transport arm as in claim 10 where the four bar linkage comprises a quadrilateral linkage have four rotating joints all located at the second link.

12. A substrate transport arm as in claim 11 where the quadrilateral linkage comprises a convex quadrilateral linkage.

13. A substrate transport arm as in claim 10 where the third link comprises an end effector, and where the wrist member rotatably connects the end effector to the second link.

14. A substrate transport arm as in claim 10 where the shaft is fixedly connected to the first link, and where the shaft extends at least partially into the second link at the joint between the first and second links.

15. An apparatus comprising:
a robot arm comprising a first link, a second link rotatably connected to the first link, and an end effector rotatably connected to the second link, where the first link, the second link and the end effector are connected in series, where the end effector is connected to the second link by a wrist member rotatably attached to the second link;
a four-bar linkage connected to the second link, where the four-bar linkage comprises a carrier rotatably mounted to the second link, the wrist member rotatably mounted to the second link, and two bars connecting the carrier to the wrist member, where the two bars have first ends rotatably connected to the carrier and second ends rotatably connected to the wrist member, and where the carrier comprises a rotatable carrier pulley rotatably mounted to the second link; and
a driver at a joint of the second link to the first link, where the driver is connected to the rotatable carrier pulley to rotate the rotatable carrier pulley on the second link based upon the second link rotating relative to the first link, where the driver comprises a shaft fixedly connected to the first link, a drive pulley on the shaft, and a band connecting the drive pulley to rotatable carrier pulley, where the shaft has the drive pulley fixed thereto such that rotation of the first link relative to the second link effects rotation of the second link relative to the drive pulley, where the drive pulley is located inside a loop formed by the band,
where the driver and the four-bar linkage are configured to maintain radial orientation of the end effector to a limited single orientation relative to the first and second links regardless of a rotational angle of the second link relative to the first link.

* * * * *